US011385973B1

(12) United States Patent
Singleton, IV

(10) Patent No.: US 11,385,973 B1
(45) Date of Patent: Jul. 12, 2022

(54) HIGH-AVAILABILITY FOR POWER-MANAGED VIRTUAL DESKTOP ACCESS

(71) Applicant: Citrix Systems, Inc., Fort Lauderdale, FL (US)

(72) Inventor: Leo C. Singleton, IV, Fort Lauderdale, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 0 days.

(21) Appl. No.: 17/125,251

(22) Filed: Dec. 17, 2020

(51) Int. Cl.
*G06F 11/14* (2006.01)
*G06F 1/30* (2006.01)
*G06F 9/455* (2018.01)

(52) U.S. Cl.
CPC ............ *G06F 11/1484* (2013.01); *G06F 1/30* (2013.01); *G06F 9/45558* (2013.01); *G06F 11/1407* (2013.01); *G06F 2009/45575* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 8,990,809 | B1 * | 3/2015 | Jacob | G06F 8/61 718/1 |
| 10,789,195 | B1 * | 9/2020 | Jha | G06F 9/546 |
| 2008/0133687 | A1 * | 6/2008 | Fok | H04L 12/40019 709/207 |
| 2013/0167147 | A1 * | 6/2013 | Corrie | G06F 9/45533 718/1 |
| 2019/0025903 | A1 * | 1/2019 | Mehta | G06F 9/45558 |
| 2020/0042411 | A1 * | 2/2020 | Krishnan | G06F 11/2023 |
| 2020/0209946 | A1 * | 7/2020 | Visconti | G06F 1/329 |

OTHER PUBLICATIONS

Anonymous: "Citrix Virtual Apps and Desktops service—Autoscale", Oct. 15, 2020 (Oct. 15, 2020), pp. 1-25, XP055902816, Retrieved from the Internet: URL:https://web.archive.org/web/20201016090927/https://docs.citrix.com/en-us/citrix-virtual-apps-desktops-service/manage-deployment/autoscale.html [retrieved on Mar. 18, 2022].

(Continued)

*Primary Examiner* — Wynuel S Aquino
(74) *Attorney, Agent, or Firm* — Daly, Crowley, Mofford & Durkee, LLP

(57) ABSTRACT

A method can include receiving, by a high-availability (HA) service running in a data center having a plurality of virtual machines (VMs) and a hypervisor, credentials for the hypervisor and a list of VMs, the hypervisor credentials and the list of VMs received from a power and capacity management (PCM) service, the PCM service configured to selectively power VMs from the list of VMs on and off; sending, from the HA service to the PCM service, a health check request to determine if the PCM service is able of selectively power the VMs from the list of VMs on and off; and in response to determining the PCM service is unable to selectively power the VMs from the list of VMs on and off, powering on, by the HA service, one or more of the VMs from the list of VMs using the hypervisor credentials received from the PCM service.

19 Claims, 9 Drawing Sheets

(56) References Cited

OTHER PUBLICATIONS

Anonymous: "Local Host Cache", Dec. 3, 2020 (Dec. 3, 2020), pp. 1-8, XP055902715, Retrieved from the Internet: URL:https://web.archive.org/web/20201203224037/https://docs.citrix.com/en-us/citrix-virtual-apps-desktops-service/manage-deployment/local-host-cache.html [retrieved on Mar. 17, 2022].

Augustin Jose: "Tech Preview: Power operations during Local Host Cache (LHC) mode", Aug. 31, 2020 (Aug. 31, 2020), pp. 1-6, XP055902853, Retrieved from the Internet: URL:https://www.citrix.com/blogs/2020/08/31/tech-preview-power-operations-during-local-host-cache-lhc-mode/ [retrieved on Mar. 18, 2022].

International Search Report and Written Opinion issued in App. No. PCT/US2021/061370, dated Mar. 28, 2022, 16 pages.

Kaviani Nima: "Health Checking Applications in the Cloud—Part I Cloud Foundry", Dec. 8, 2017 (Dec. 8, 2017), pp. 1-9, XP055902814, Retrieved from the Internet: URL:https://www.cloudfoundry.org/blog/health-check-apps-cloud-part-1/ [retrieved on Mar. 18, 2022].

\* cited by examiner

HIGH-AVAILABILITY FOR POWER-MANAGED VIRTUAL DESKTOP ACCESS

BACKGROUND

Cloud computing architectures enable ubiquitous, convenient, on-demand network access to a shared pool of configurable computing resources that can be rapidly provisioned and released with minimal management effort or service provider interaction. Cloud computing models can use a management server that allows many different organizations (or "customers") to deploy cloud-hosted virtual desktops and application software ("apps") and allows end users to access said resources. Virtual desktops and apps can also be provided using an on-prem setup whereby an organization hosts its own virtualization hardware and/or software. In either case, the management server may be provided as a cloud-based service sometimes referred to as a virtual desktop access (VDA) service. The management server can be hosted in a cloud system is the same as or different from the cloud system, or on-prem system, in which an organization's virtual desktops and apps are hosted. Virtual desktops and apps may be stateful across user sessions to prevent loss of work. The management server may be responsible for provisioning VDA resources and managing the allocation of virtual desktops and apps to end users, a process referred to as brokering. One example of a management server is CITRIX VIRTUAL APPS AND DESKTOPS (CVAD) service.

To reduce usage costs, some cloud systems provide auto scaling features to automatically power on and off computing resources based on load or other criteria. However, cloud system-provided auto scaling may be unsuitable for virtual desktop and app resources because of their stateful nature. Accordingly, a management server such as CVAD may provide more advanced power and capacity management (PCM) that automatically powers virtual machines (VMs) on and off in a manner that does not disrupt user sessions or result in loss of work. Using an interface provided by the management server, organizations can configure policies to power off unused VMs based on time of day, load thresholds, or other criteria to reduce their cloud system costs.

SUMMARY

One challenge of automatic PCM is resiliency—if the PCM service fails to power on VMs during peak usage periods, there may not be enough capacity to satisfy user demand, leading to an outage. One solution to this problem is for each organization to host and manage a local copy of the management server within its cloud system or on-prem. It is recognized herein that requiring organizations to run a local copy of the management server (or substantial portions thereof) can be costly in terms of maintenance effort and resource usage. Accordingly, described herein are embodiments of a lightweight, high-availability (HA) power management service that can be readily deployed within a customer's data center or cloud system within a stateless container.

According to one aspect of the disclosure, a method includes: receiving, by a high-availability (HA) service running in a data center having a plurality of virtual machines (VMs) and a hypervisor configured to power the VMs on and off, credentials for the hypervisor and a list of VMs, the hypervisor credentials and the list of VMs received from a power and capacity management (PCM) service running outside the data center, the PCM service configured to selectively power VMs from the list of VMs on and off according to one or more criteria; sending, from the HA service to the PCM service, a health check request to determine if the PCM service is able of selectively power the VMs from the list of VMs on and off according to the one or more criteria; and in response to determining the PCM service is unable to selectively power the VMs from the list of VMs on and off according to the one or more criteria, powering on, by the HA service, one or more of the VMs from the list of VMs using the hypervisor credentials received from the PCM service.

In some embodiments, powering on the one or more of the VMs from the list of VMs includes powering on all VMs in the list of VMs received from the PCM service. In some embodiments, the method further includes receiving a health check response from the PCM service indicating the PCM service is unable of selectively power the VMs from the list of VMs on and off according to the one or more criteria. In some embodiments, the one or more criteria are stored in a database, wherein the receiving of the health check response from the PCM service includes receiving the health check response in response to the PCM service being unable to access the database. In some embodiments, determining the PCM service is unable of selectively power the VMs from the list of VMs on and off according to the one or more criteria includes detecting the PCM service did not respond to the health check request.

In some embodiments, the PCM service is configured to selectively power VMs from the list of VMs on and off according to a load threshold. In some embodiments, the PCM service is configured to selectively power VMs from the list of VMs on and off according to a schedule. In some embodiments, the HA service is be deployed within a stateless container. In some embodiments, the data center is operated by a first cloud system and the PCM service runs in a second cloud system different from the first cloud system. In some embodiments, one or more of the plurality of VMs are configured as virtual desktops.

According to another aspect of the disclosure, a method includes: sending, from a power and capacity management (PCM) service, hypervisor credentials and lists of virtual machines (VMs) to a plurality of high-availability (HA) services running in a plurality of data centers having VMs and hypervisors configured to power the VMs on and off; receiving, by the PCM service, a health check request from at least one of the HA services to determine if the PCM service is able of selectively power VMs from a list of VMs on and off according to one or more criteria; and sending, by the PCM service, a response to the at least one of the HA services indicating that the PCM service is unable to selectively power the VMs from the list of VMs on and off according to the one or more criteria, wherein the at least one of the HA services is configured to power on one or more of the VMs from the list of VMs using the hypervisor credentials received from the PCM service.

In some embodiments, powering on the one or more of the VMs from the list of VMs includes powering on all VMs in the list of VMs received from the PCM service. In some embodiments, the method further includes determining that the PCM service is unable to selectively power the VMs from the list of VMs on and off according to the one or more criteria by detecting a database failure. In some embodiments, the plurality of data centers includes data centers operated by at least two different cloud systems. In some embodiments, the plurality of data centers includes data centers located in at least two different regions of the same cloud system. In some embodiments, the PCM service runs in a first cloud system and at least one of the plurality of data centers is operated by a second cloud system different from the first cloud system. In some embodiments, the HA services are deployed within stateless containers. In some embodiments, the plurality of data centers includes VMs configured as virtual desktops.

According to another aspect of the disclosure, an apparatus located in a data center having a plurality of virtual machines (VMs) and a hypervisor configured to power the VMs on and off comprises a processor and a non-volatile memory storing computer program code. The code, when executed on the processor, causes the processor to execute a process operable to: receive credentials for the hypervisor and a list of VMs from a power and capacity management (PCM) service running outside the data center, the PCM service configured to selectively power VMs from the list of VMs on and off according to one or more criteria; send a health check request to determine if the PCM service is able of selectively power the VMs from the list of VMs on and off according to the one or more criteria; and in response to determining the PCM service is unable to selectively power the VMs from the list of VMs on and off according to the one or more criteria, power on one or more of the VMs from the list of VMs using the hypervisor credentials received from the PCM service.

BRIEF DESCRIPTION OF THE DRAWINGS

The manner of making and using the disclosed subject matter may be appreciated by reference to the detailed description in connection with the drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Figure 1:
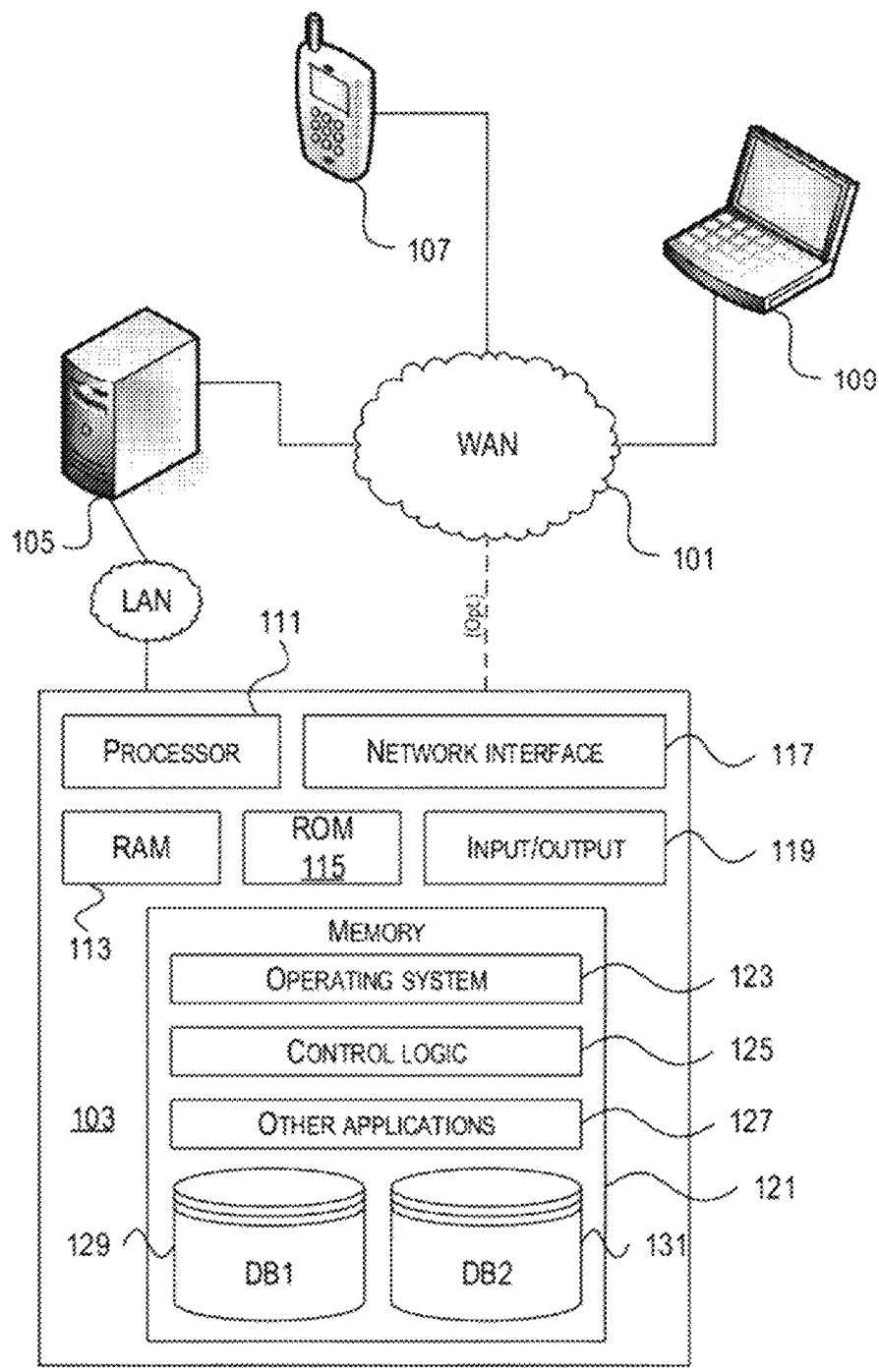
FIG. 1 depicts an illustrative computer system architecture that may be used in accordance with one or more illustrative aspects of the concepts described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects of the concepts described herein in a standalone and/or networked environment. Various network node devices 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topologies and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components and devices which make up the system of FIG. 1 may include data server 103, web server 105, and client computers 107, 109. Data server 103 provides overall access, control and administration of databases and control software for performing one or more illustrative aspects of the concepts described herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used in the system architecture and data processing device of FIG. 1, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) interfaces 119 may include a variety of interface units and drives for reading, writing, displaying, and/or printing data or files. Memory 121 may store operating system software 123 for controlling overall operation of the data server 103, control logic 125 for instructing data server 103 to perform aspects of the concepts described herein, and other application software 127 providing secondary, support, and/or other functionality which may or might not be used in conjunction with aspects of the concepts described herein. The control logic 125 may also be referred to herein as the data server software. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the concepts described herein. Memory 121 may include, for example, a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to data server 103. Those of skill in the art will appreciate that the functionality of data server 103 (or device 105, 107, or 109) as described herein may be spread across multiple data processing devices, for example, to distribute processing load across multiple computers, to segregate transactions based on geographic location, user access level, quality of service (QoS), etc.

One or more aspects of the concepts described here may be embodied as computer-usable or readable data and/or as computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution or may be written in a scripting language such as (but not limited to) Hypertext Markup Language (HTML) or Extensible Markup Language (XML). The computer executable instructions may be stored on a computer readable storage medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source node and a destination node (e.g., the source node can be a storage or processing node having information stored therein which information can be transferred to another node referred to as a "destination node"). The media can be transferred in the form of electromagnetic waves traveling through signal-conducting media such as metal wires, optical fibers, and/or wireless transmission media (e.g., air and/or space). Various aspects of the concepts described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects of the concepts described herein, and such data structures are contemplated within the scope of computer executable instructions and computer-usable data described herein.

Figure 2:
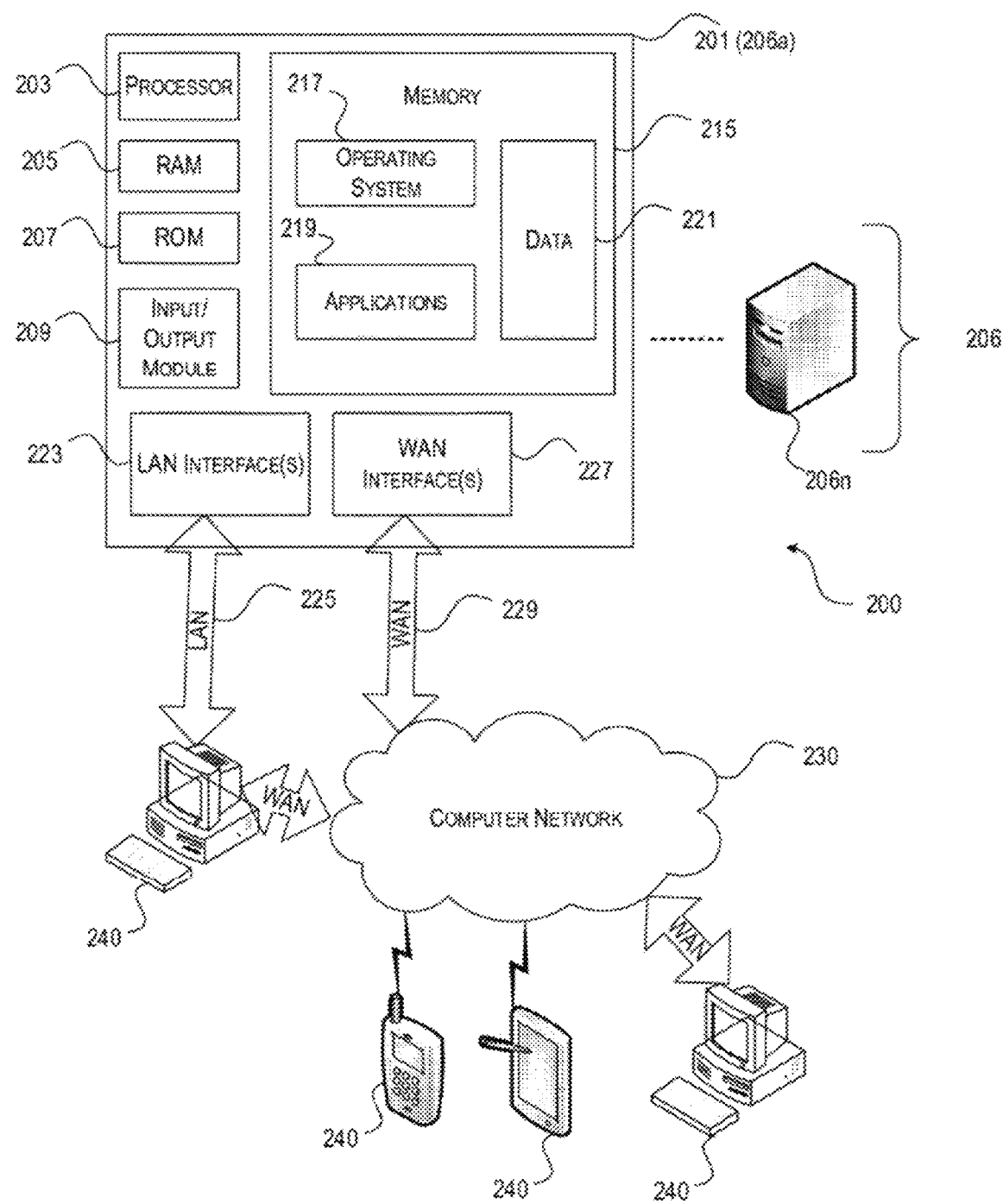
FIG. 2 depicts an illustrative remote-access system architecture that may be used in accordance with one or more illustrative aspects of the concepts described herein.

With further reference to FIG. 2, one or more aspects of the concepts described herein may be implemented in a remote-access environment. FIG. 2 depicts an example system architecture including a computing device 201 in an illustrative computing environment 200 that may be used according to one or more illustrative aspects of the concepts described herein. Computing device 201 may be used as a server 206a in a single-server or multi-server desktop virtualization system (e.g., a remote access or cloud system) configured to provide VMs for client access devices. The computing device 201 may have a processor 203 for controlling overall operation of the server and its associated components, including RAM 205, ROM 207, input/output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all the elements described above with respect to the data server 103 or computing device 201. The network connections depicted in FIG. 2 include a local area network (LAN) 225 and a wide area network (WAN) 229 but may also include other networks. When used in a LAN networking environment, computing device 201 may be connected to the LAN 225 through an adapter or network interface 223. When used in a WAN networking environment, computing device 201 may include a modem or other wide area network interface 227 for establishing communications over the WAN 229, such as to computer network 230 (e.g., the Internet). It will be appreciated that the network connections shown are illustrative and other means of establishing a communication link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects of the concepts described herein may also be operational with numerous other general purpose or special purpose computing system environments or configurations. Examples of other computing systems, environments, and/or configurations that may be suitable for use with aspects of the concepts described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more terminals 240 may be in communication with one or more servers 206a-206n (generally referred to herein as "server(s) 206"). In one embodiment, the computing environment 200 may include a network appliance installed between the server(s) 206 and terminals 240. The network appliance may manage client/server connections, and in some cases can load balance client connections amongst a plurality of back-end servers 206.

The terminals 240 may in some embodiments be referred to as a single computing device or a single group of client computing devices, while server(s) 206 may be referred to as a single server 206 or a group of servers 206. In one embodiment, a single terminal 240 communicates with more than one server 206, while in another embodiment a single server 206 communicates with more than one terminal 240. In yet another embodiment, a single terminal 240 communicates with a single server 206.

A terminal 240 can, in some embodiments, be referred to as any one of the following non-exhaustive terms: client machine(s); client(s); client computer(s); client device(s); client computing device(s); local machine; remote machine; client node(s); endpoint(s); or endpoint node(s). The server 206, in some embodiments, may be referred to as any one of the following non-exhaustive terms: server(s), local machine; remote machine; server farm(s), or host computing device(s).

In one embodiment, the terminal 240 may be a VM. The VM may be any VM, while in some embodiments the VM may be any VM managed by a Type 1 or Type 2 hypervisor, for example, a hypervisor developed by Citrix Systems, IBM, VMware, or any other hypervisor. In some aspects, the VM may be managed by a hypervisor, while in other aspects the VM may be managed by a hypervisor executing on a server 206 or a hypervisor executing on a terminal 240.

Some embodiments include a terminal 240 that displays application output generated by an application remotely executing on a server 206 or other remotely located machine. In these embodiments, the terminal 240 may execute a VM receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Fort Lauderdale, Fla.; or the Remote Desktop Protocol (RDP) manufactured by Microsoft Corporation of Redmond, Wash.

A remote computing environment may include more than one server 206a-206n logically grouped together into a server farm 206, for example, in a cloud computing environment. The server farm 206 may include servers 206a-206n that are geographically dispersed while logically grouped together, or servers 206a-206n that are located proximate to each other while logically grouped together. Geographically dispersed servers 206a-206n within a server farm 206 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, the server farm 206 may be administered as a single entity, while in other embodiments the server farm 206 can include multiple server farms.

In some embodiments, a server farm 206 may include servers that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server, a master application server, a server executing an active directory, or a server executing an application acceleration program that provides firewall functionality, application functionality, or load balancing functionality. Other server types may also be used.

Some embodiments include a first server 206a that receives requests from a terminal 240, forwards the request to a second server 206b (not shown), and responds to the request generated by the terminal 240 with a response from the second server 206b (not shown). First server 206a may acquire an enumeration of applications available to the terminal 240 as well as address information associated with an application server 206 hosting an application identified within the enumeration of applications. First server 206a can present a response to the client's request using a web interface and communicate directly with the terminal 240 to provide the terminal 240 with access to an identified application. One or more terminals 240 and/or one or more servers 206 may transmit data over network 230, e.g., network 101.

Figure 3:
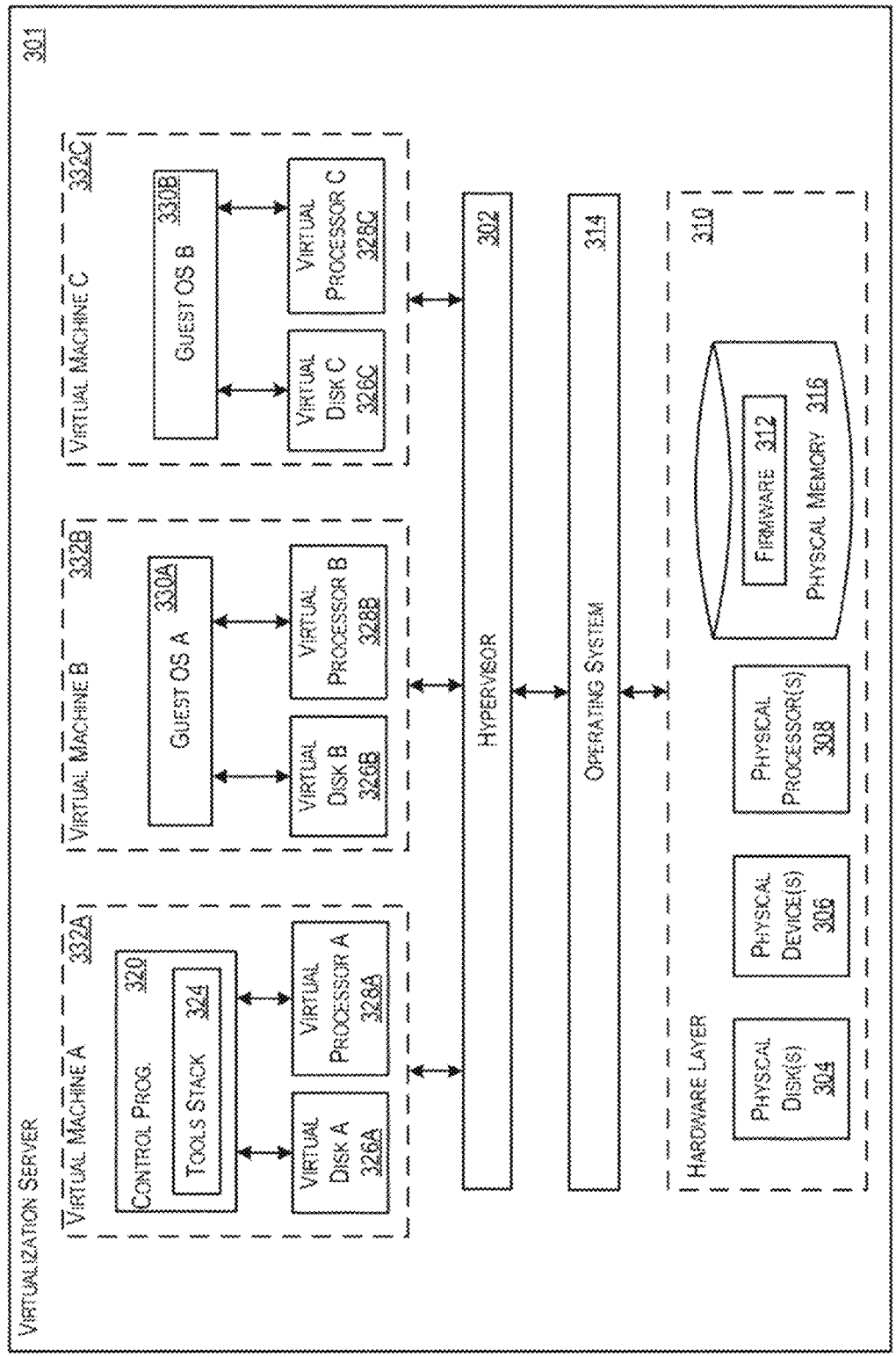
FIG. 3 depicts an illustrative virtualized (hypervisor) system architecture that may be used in accordance with one or more illustrative aspects of the concepts described herein.

FIG. 3 shows a high-level architecture of an illustrative application virtualization system. As shown, the application virtualization system may be single-server or multi-server system, or cloud system, including at least one virtualization server 301 configured to provide virtual desktops and/or virtual applications to one or more terminals 240 (FIG. 2). As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an operating system running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer 310 that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more VMs 332A-C (generally 332). Each VM 332 may have a virtual disk 326A-C and a virtual processor 328A-C. In some embodiments, a first VM 332A may execute, using a virtual processor 328A, a control program 320 that includes a tools stack 324. Control program 320 may be referred to as a control VM, Dom0, Domain 0, or other VM used for system administration and/or control. In some embodiments, one or more VMs 332B-C can execute, using a virtual processor 328B-C, a guest operating system 330A-B.

Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

In some embodiments, hypervisor 302 may be a program executed by processors 308 on virtualization server 301 to create and manage any number of VMs 332. Hypervisor 302 may be referred to as a VM monitor, or platform virtualization software. In some embodiments, hypervisor 302 can be any combination of executable instructions and hardware that monitors VMs executing on a computing machine. Hypervisor 302 may be Type 2 hypervisor, where the hypervisor executes within an operating system 314 executing on the virtualization server 301. VMs may execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301 and may include program data stored in the physical memory 316.

Hypervisor 302, in some embodiments, can provide virtual resources to operating systems 330 or control programs 320 executing on VMs 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute VMs that provide access to computing environments. In still other embodiments, hypervisor 302 may control processor scheduling and memory partitioning for a VM 332 executing on virtualization server 301. In some embodiments, virtualization server 301 may execute a hypervisor 302 that creates a VM platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more VMs 332B-C (generally 332) in which guest operating systems 330 execute. In some embodiments, hypervisor 302 may load a VM image to create a VM 332. In other embodiments, the hypervisor 302 may execute a guest operating system 330 within VM 332. In still other embodiments, VM 332 may execute guest operating system 330.

In addition to creating VMs 332, hypervisor 302 may control the execution of at least one VM 332. In other embodiments, hypervisor 302 may present at least one VM 332 with an abstraction of at least one hardware resource provided by the virtualization server 301 (e.g., any hardware resource available within the hardware layer 310). In other embodiments, hypervisor 302 may control the way VMs 332 access physical processors 308 available in virtualization server 301. Controlling access to physical processors 308 may include determining whether a VM 332 should have access to a processor 308, and how physical processor capabilities are presented to the VM 332.

As shown in FIG. 3, virtualization server 301 may host or execute one or more VMs 332. A VM 332 is a set of executable instructions that, when executed by a processor 308, may imitate the operation of a physical computer such that the VM 332 can execute programs and processes much like a physical computing device. While FIG. 3 illustrates an embodiment where a virtualization server 301 hosts three VMs 332, in other embodiments virtualization server 301 can host any number of VMs 332. Hypervisor 302, in some embodiments, may provide each VM 332 with a unique virtual view of the physical hardware, memory, processor, and other system resources available to that VM 332. In some embodiments, the unique virtual view can be based on one or more of VM permissions, application of a policy engine to one or more VM identifiers, a user accessing a VM, the applications executing on a VM, networks accessed by a VM, or any other desired criteria. For instance, hypervisor 302 may create one or more unsecure VMs 332 and one or more secure VMs 332. Unsecure VMs 332 may be prevented from accessing resources, hardware, memory locations, and programs that secure VMs 332 may be permitted to access. In other embodiments, hypervisor 302 may provide each VM 332 with a substantially similar virtual view of the physical hardware, memory, processor, and other system resources available to the VMs 332.

Each VM 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each VM 332 with a unique view of the physical disks 304. Thus, in these embodiments, the particular virtual disk 326 included in each VM 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all the same characteristics of at least one physical processor 308. In other embodiments, virtual processor 328 provides a modified view of physical processors 308 such that at least some of the characteristics of the virtual processor 328 are different than the characteristics of the corresponding physical processor 308.

Figure 4:
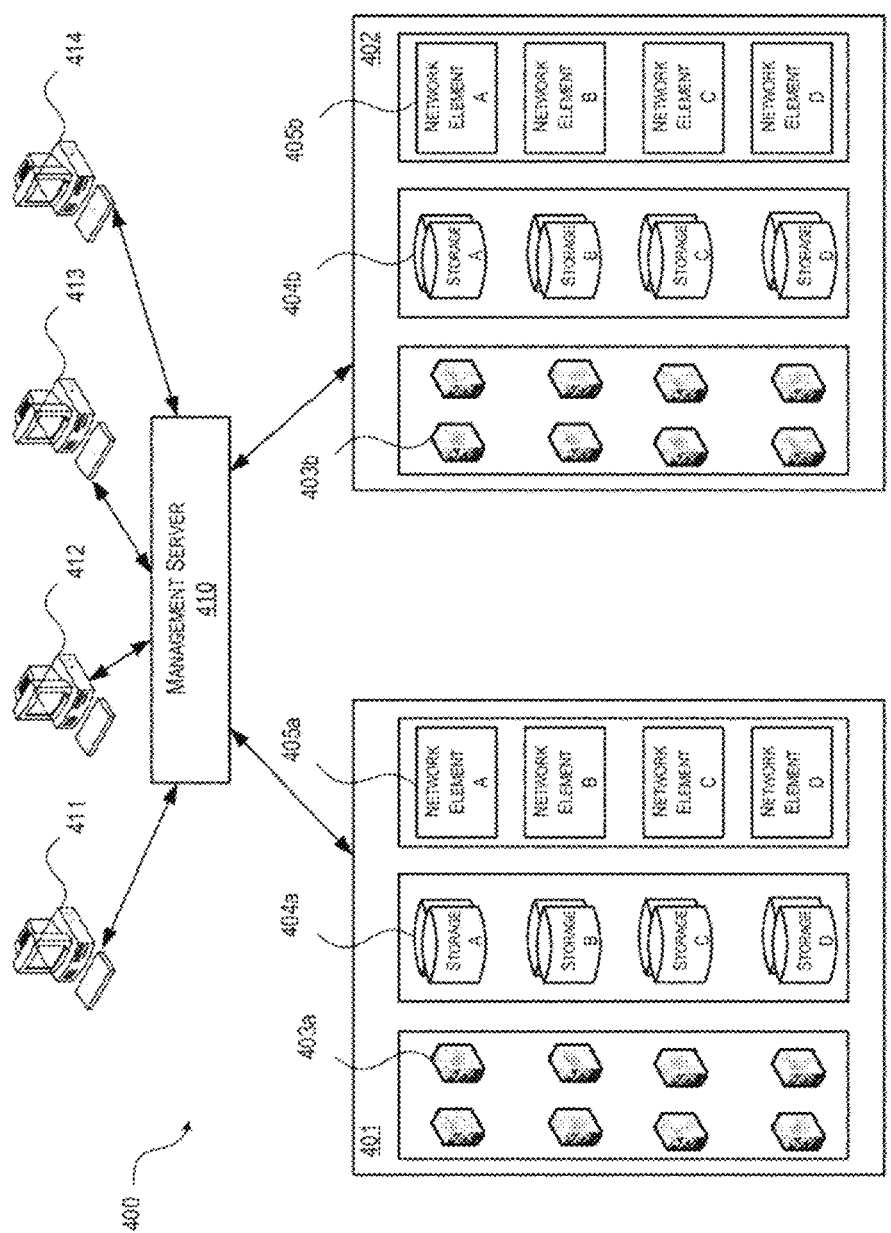
FIG. 4 depicts an illustrative cloud-based system architecture that may be used in accordance with one or more illustrative aspects of the concepts described herein.

With further reference to FIG. 4, some aspects of the concepts described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred to herein as "host servers 403"), storage resources 404a-404b (generally referred to herein as "storage resources 404"), and network resources 405a-405b (generally referred to herein as "network resources 405")) of the cloud system.

Management server 410 may be implemented on one or more physical servers. The management server 410 may include, for example, a cloud computing platform or solution, such as APACHE CLOUDSTACK by Apache Software Foundation of Wakefield, MA, among others. Management server 410 may manage various computing resources, including cloud hardware and software resources, for example, host servers 403, storage resources 404, and network resources 405. The cloud hardware and software resources may include private and/or public components. For example, a cloud environment may be configured as a private cloud environment to be used by one or more customers or client computers 411-414 and/or over a private network. In other embodiments, public cloud environments or hybrid public-private cloud environments may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy VMs within the cloud environment. Client computers 411-414 may connect to management server 410 via the Internet or some other communication network and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage VMs and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain client computers 411-414 may be related, for example, different client computers creating VMs on behalf of the same end user, or different users affiliated with the same company or organization. In other examples, certain client computers 411-414 may be unrelated, such as users affiliated with different companies or organizations. For unrelated clients, information on the VMs or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud computing resources. For example, zone 401 may be a first cloud datacenter located in California and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud environment (e.g., client computers 411-414) might or might not be aware of the distinctions between zones. For example, an end user may request the creation of a VM having a specified amount of memory, processing power, and network capabilities. The management server 410 may respond to the user's request and may allocate resources to create the VM without the user knowing whether the VM was created using resources from zone 401 or zone 402. In other examples, the cloud system may allow end users to request that VMs (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more host servers 403, such as the virtualization servers 301 (FIG. 3), which may be configured to create and host VM instances. The physical network resources in a cloud zone 401 or 402 may include one or more network resources 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment 400 shown in FIG. 4 also may include a virtualization layer (e.g., as shown in FIGS. 1-3) with additional hardware and/or software resources configured to create and manage VMs and provide other services to customers using the physical resources in the cloud environment. The virtualization layer may include hypervisors, as described above in connection with FIG. 3, along with other components to provide network virtualizations, storage virtualizations, etc. The virtualization layer may be as a separate layer from the physical resource layer or may share some or all the same hardware and/or software resources with the physical resource layer. For example, the virtualization layer may include a hypervisor installed in each of the host servers 403 with the physical computing resources. Known cloud systems may alternatively be used, e.g., WINDOWS AZURE (Microsoft Corporation of Redmond, Wash.), AMAZON EC2 (Amazon.com Inc. of Seattle, Wash.), IBM BLUE CLOUD (IBM Corporation of Armonk, N.Y.), or others.

Figure 5:
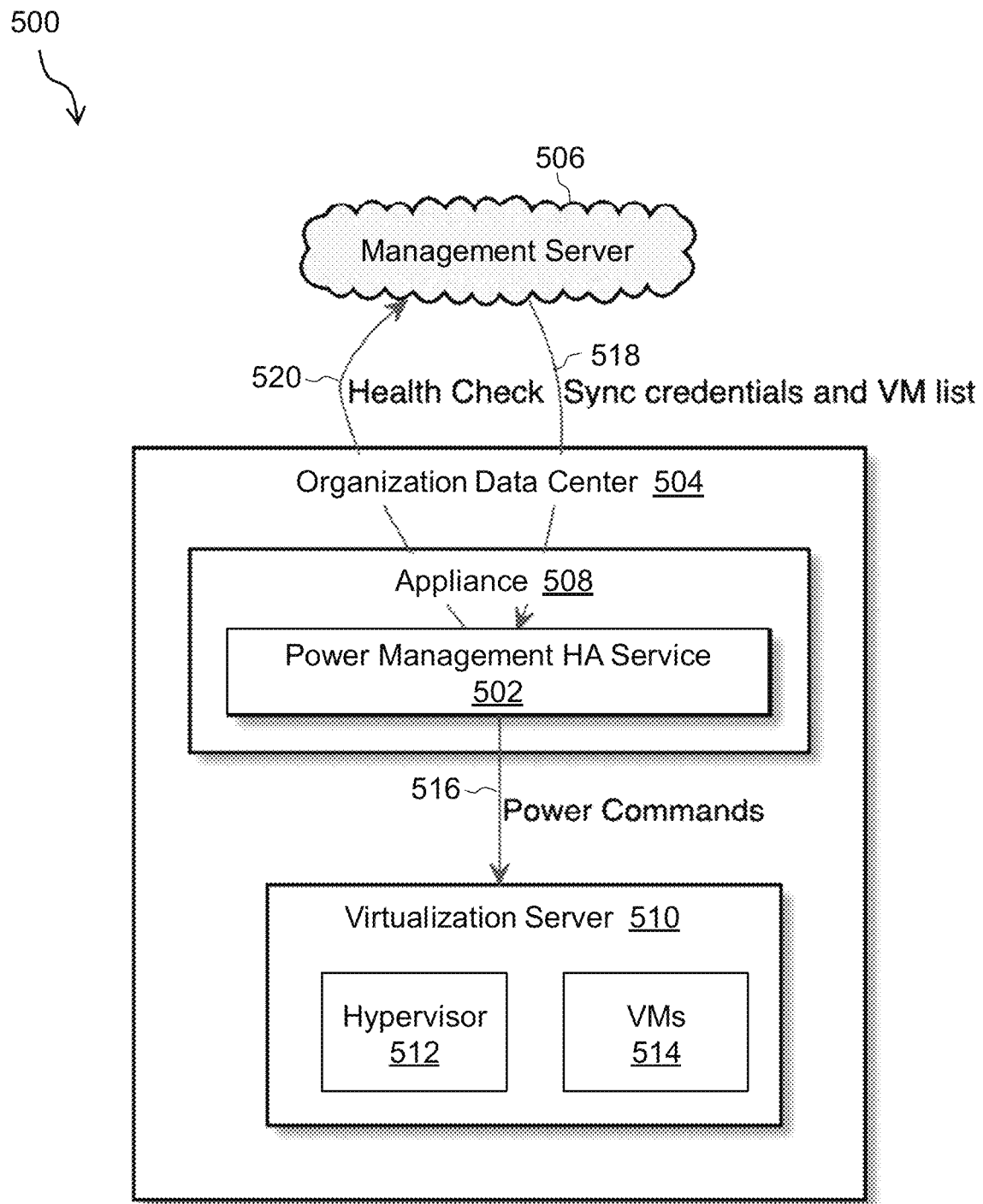
FIG. 5 is a diagram of a remote-access system architecture including a power management high-availability (HA) service deployed in an organization's data center, according to some embodiments of the present disclosure.

FIG. 5 is a diagram of a remote-access system architecture 500 including a power management high-availability (HA) service 502 deployed in an organization's data center 504, according to some embodiments. The architecture 500 also includes a management server 506 which provides virtual desktop access (VDA) to virtual desktops and apps hosted in the organization's data center 504. Management server 506 can provide various VDA services including but not limited to user session management, resource brokering and provisioning, and power and capacity management (PCM). In some embodiments, management server 506 can automatically power virtual machines (VMs) within the organization's data center 504 based on day of week, time of day, load thresholds, or other criteria. Management server 506 can communicate with data center 504 over one or more public or private networks. In some embodiments, management server 506 may be the same as or similar to management server 410 of FIG. 4 and/or management server 600 of FIG. 6.

Briefly, power management HA service (or "HA service") 502 is a standalone component that can detect faults within management server 506 or, more particularly, within the PCM functions provided thereby. Such faults can include loss of network connectivity between management server 506 and organization's data center 504. Other faults include hardware or software errors within the management server 506. In response to detecting a fault, HA service 502 can automatically power on one more of an organization's VMs to help ensure there is sufficient resource capacity to serve the organization's end users, as described in more detail below. In the example shown, HA service 502 runs on an appliance 508 which can be provided as physical or virtual machine. In one example, HA service 502 can be deployed onto an appliance or other device configured to run CITRIX CLOUD CONNECTOR. In some embodiments, HA service 502 may be deployed as a container, such as a DOCKER container, a HYPER-V container, an LXC container, etc. In some embodiments, a containerized HA service 502 may be deployed into the data center 504 by a management server 506 or other external system. In some embodiments, HA service 502 may be stateless (e.g., deployed within a stateless container), meaning that that does not rely on persistent storage to perform the corresponding functions described herein. This allows HA service 502 to be readily deployed on an appliance or other thin device within limited resources. Notably, HA service 502 does not need to track user sessions, VDA resource allocation, or perform other relatively complex functions of the management server 506.

The data center 504, which can be on-prem or cloud-based, includes a virtualization server 510 having a hypervisor 512 and one or more virtual machines (VMs) 514. The data center 504 and virtualization server 510 can include various other hardware and software components which, for the sake of clarity, are not shown in FIG. 5. In some embodiments, virtualization server 510 can be the same as or similar to virtualization server 301 described above in the context of FIG. 3.

Under normal conditions, management server 506 can cause VMs 514 to be powered on and off by sending commands to appliance 508 which, in turn, can issue power commands 516 to hypervisor 512. Management server 506 can serve one or more organizations and, for each organization, it can store configuration information including but not limited to user credentials, hypervisor credentials, a list of VMs and other VDA resources available in the organization's data center, and the criteria used by PCM to determine when VMs should be powered on and off. Such configuration information can be stored in a database or other persistent storage means. In the case of a database failure, a loss of network connectivity between management server 506 and data center 504, or another type of fault, management server 506 may be unable to power VMs on and off, which can lead to an outage in that end users may not be able to access their virtual desktops or apps. For example, if an organization chooses to have most of the VMs powered off between the hours of 11:00 p.m. and 5:00 a.m. and the management server 506 fails at 4:00 a.m. on a particular day, the organization's end users may be prevented from accessing their remote desktops and apps that morning. HA service 502 protects against such outages by acting as a fail-safe mechanism on the management server's 506 PCM functionality.

At startup and/or at points in time thereafter, HA service 502 can receive information from management server 506 that allows HA service 502 to automatically power VMs on or off. In some embodiments, HA service 502 can receive credentials for the hypervisor 512 along with a list of one or more VMs 514 in the organization's data center. The particular information received from the management server 506 can vary depending on the type of hypervisor used. For example, the received information can include unique identifiers (e.g., names or numeric identifiers) for the VMs in addition to credentials suitable to access the hypervisor's API. In some embodiments, the HA service 502 can receive can additionally receive details about disks and network interfaces belonging to or otherwise associated with the VMs. Such information can be pushed from the management server 506 to the HA service 502, requested by the HA service 502 from the management server 506, or otherwise synchronized between the management server 506 and HA service 502. In some embodiments, HA service 502 can be configured to automatically synchronize with the management server 506 at startup. If the HA service 502 restarts (e.g., due to an error or routine maintenance), HA service 502 can automatically re-synchronize with the management server 506. In this way, HA service 502 can be deployed within a stateless container that does not rely on database access or other persistent storage means to perform the HA power management functions described here.

HA service 502 is configured to send health check requests 520 to management server 506 to determine if the management server's PCM functionality is operating normally or if a fault condition exists (or potentially exists) that would prevent the management server from managing VMs 514 in the organization's data center 504. HA service 502 can send health check requests 520 periodically, such as every N minutes, or at particular times of the day. The schedule by which HA service 502 sends health check requests can be hardcoded or configured by the organization. Such configuration information can be stored by management server 506 and synchronized with the HA service 502 (e.g., as part of information 518). Management server 506 can provide one or more user interfaces (UIs) via which an organization can configure operation of the PCM service and/or the HA service.

Responsive to one or more health check requests 520, HA service 502 can detect if a PCM fault condition exists. For example, if management server 506 fails to respond to a health check request 520 after a predetermined timeout period (e.g., M seconds), HA service 502 can detect a PCM fault condition. As another example, if management server 506 provides a response to a health check request 520 indicating that its PCM functionality is not operating normally, HA service 520 can detect a PCM fault condition. In some embodiments, management server 506 can directly inform the HA service 502 of a fault, such as a failure of a database or other dependent service or component.

In response to detecting a PCM fault condition, HA service 502 can enter a fail-safe mode wherein it performs one or more actions to prevent an VDA outage. For example, using information 518 previously received from management server 506, HA service 502 can automatically power on one or more of the organization's VMs 514. In more detail, HA service 502 can iterate through a list of VMs and, for each VM, can issue a power on command 516 to the hypervisor 512 which in turn causes the corresponding VM to boot, resume, wake from sleep, or otherwise become accessible to end users. In the case where the organization's VMs are hosted in a cloud system, HA service 502 can issue requests to an API provided by the cloud system which in turn commands the VMs to power on. In some embodiments, HA service 502 can issue power on commands to a subset of the VMs.

Figure 6:
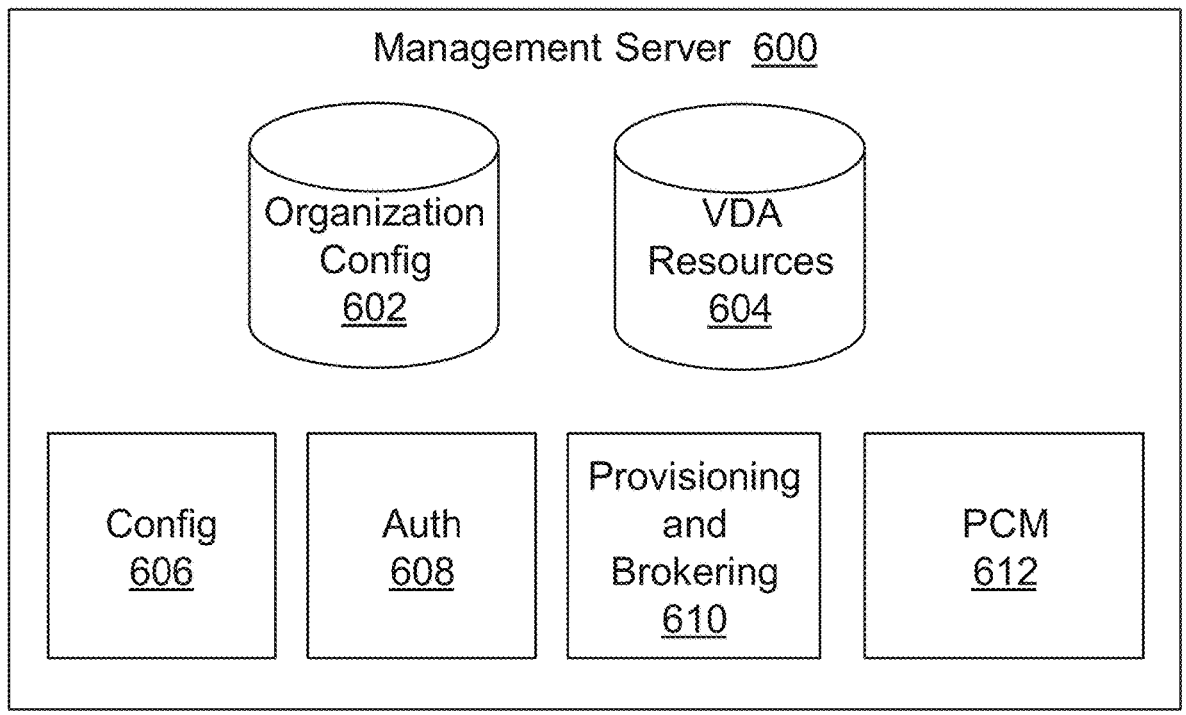
FIG. 6 is a diagram showing an example of a management server that can be used within a remote-access system, according to some embodiments of the present disclosure.

FIG. 6 illustrates portions of a management server 600 that can be the same as or similar to management server 506 of FIG. 5. The illustrative management server 600 includes one or more databases to store organization configuration information 602 and VDA resource information 604. The organization configuration information 602 includes information about one or more organizations for which the management server 600 provides VDA, such as a list of an organization's end users and associated user credentials, and the organization's PCM configuration (e.g., the schedule or other criteria by which the organization's VMs are automatically powered on and off). VDA resource information 604 can include lists of VDA resources available/provisioned in an organization's data center such as a list of virtual desktops, virtual apps, and/or VMs, along with information indicating which resources are currently assigned to which end users. VDA resource information 604 (or organization configuration information 602) can also include information required for the management server 600 to communicate with the organization's data center, such as a network address and credentials for an appliance running within the organization's data center (e.g., appliance 508 of FIG. 5).

Management server 600 can further include one or more modules and services, such a configuration module 606, an authentication module 608, a provisioning and brokering module 610, and a PCM service 612. Configuration module 606 can provide user interfaces (UIs) by which organizations can configure various aspects of VDA provided by management server 600. As one example, configuration module 606 can provide a PCM configuration UI via which an organization can control how and when PCM service 612 powers the organization's VDA resources on and off. Authentication module 608 can authenticate end users using, for example, user credentials stored in organization configuration information 602. Provisioning and brokering module 610 can handle various aspects of provisioning VDA resources, assigning VDA resources to end users, and updating VDA resources information 604 to keep track such assignments in a stateful manner.

PCM service 612 can access organization configuration information 602 and VDA resource information 604 to determine when and how to power VMs on and off for one or more organizations. For convenience, the phrase "power on" in reference to a VM refers to any action that causes the VM to boot, resume, wake from sleep, or otherwise become available for use. Similar, the phrase "power off" in reference to a VM refers to any action that causes the VM to halt, shutdown, hibernate, sleep, or otherwise become unusable. PCM service 612 can use the current system date and time and per-organization PCM schedule information to determine target numbers of VDA resources that each organization chooses to have available at the current date and time. If, for a given organization, the number of available VDA resources (e.g., the number of VMs that are provisioned and powered on according to VDA resource information 604) is less than a target number, PCM service 612 can issue commands to the organization's hypervisor or cloud system to power on additional VMs. PCM service 612 can also decrease the number of available VDA resources according to an organization's PCM schedule. In this case, PCM service 612 takes care not to disrupt any active user sessions by powering off only VMs that are not currently assigned to any users according to VDA resource information 604. If the number of actively used VMs is greater than the target number for the current day and time, PCM service 612 may forgo powering off VMs until the number of actively used VMs decreases.

In addition to the time-based schedules described above, PCM service 612 can also implement load-based rules for powering VMs on and off. In some embodiments, a load-based rule may be to keep a minimum of N % idle capacity. For example, if there are ten (10) single-user VMs and 20% minimum idle capacity, then PC service 612 will keep a minimum of two (2) idle VMs powered on. An idle VM is defined herein as a VM that has no active user session associated with it. If a user the connect to one of the idle VMs, the idle capacity falls from two (2) to one (1), and PCM service 612 can power on another VM, regardless of the time of day. In the case of multi-user VMs, a load-based rule may specify a target number of users per VM and PCM service 612 can determine how many VMs to power on and off based on the sum of the capacity remaining on all VMs.

The management server 600 shown in FIG. 6 is not intended to be a complete representation of a management server and software and hardware components may be included within embodiments of a management server.

Figure 7:
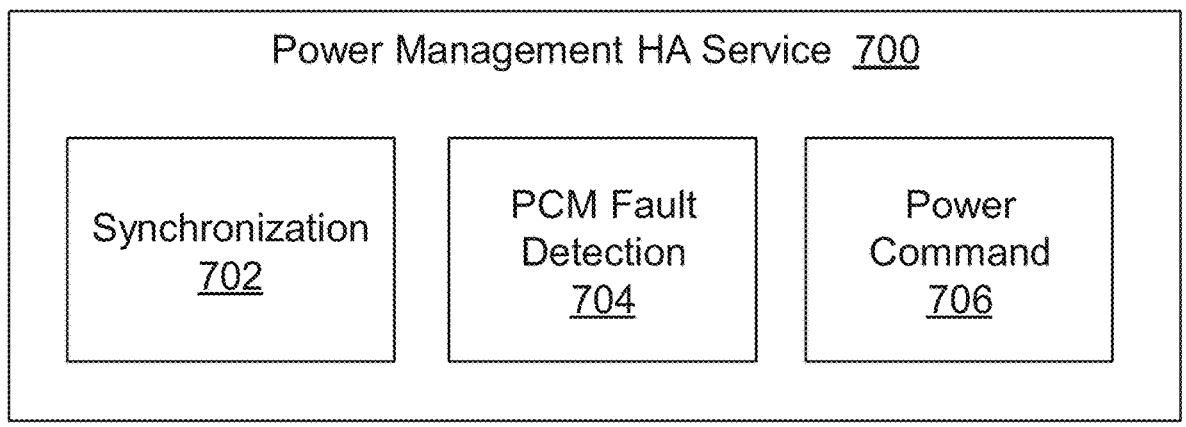
FIG. 7 is a diagram showing an example of a power management HA service that can be used within a remote-access system, according to some embodiments of the present disclosure.

FIG. 7 illustrates a power management HA service 700 that can be used within a remote-access system. For example, the illustrative a HA service 700 can be the same as or similar to a HA service 502 of FIG. 5. The illustrative HA service 700 includes a synchronization module 702, a PCM fault detection module 704, and a power command module 706.

Synchronization module 702 is configured to receive information from a management server (e.g., management server 600 of FIG. 6) necessary to automatically power on VMs in the event of a PCM fault. For example, synchronization module 702 can receive hypervisor credentials and a list of VMs provisioned with an organization's data center. In some embodiments, the management server can push this information to HA service 700, e.g., using a known IP address of an appliance on which service 700 is configured to run. In other embodiments, HA service 700 can request this information from the management server. Other synchronization techniques can be used. Synchronization module 702 can receive this information at startup and/or periodically during its runtime.

PCM fault detection module 704 sends health check requests to the management server to determine if the management server's PCM functionality is operating normally or if a fault condition exists (or potentially exists) that would prevent the management server from starting and stopping VMs in the organization's data center. As previously discussed, such health check requests can be sent periodically or at scheduled times. Responsive to one or more health check requests, PCM fault detection module 704 can detect if a fault condition exists. For example, PCM fault detection module 704 can detect a PCM fault condition if the management server fails to respond to a health check request after a predetermined timeout period or if the management server sends a response indicating a fault. PCM fault detection module 704 can use these and/or other criteria to detect a fault condition.

When a PCM fault is detected, HA service 700 can enter a fail-safe mode. In this mode, power command module 706 can automatically issue commands to the organization's hypervisor or cloud system to cause one or more VMs to be powered on. In more detail, power command module 706 can iterate through the list of VMs received by synchronization module 702 and, for each VM, can issue a power on command to the hypervisor or cloud system which in turn causes the corresponding VM to boot, resume, or otherwise become accessible to end users. It should be appreciated that interaction of modules 702-706 with each other and with the management server allows HA service 700 to run in a lightweight stateless container on a virtual or physical appliance within the organization's data center or cloud system.

Figure 8:
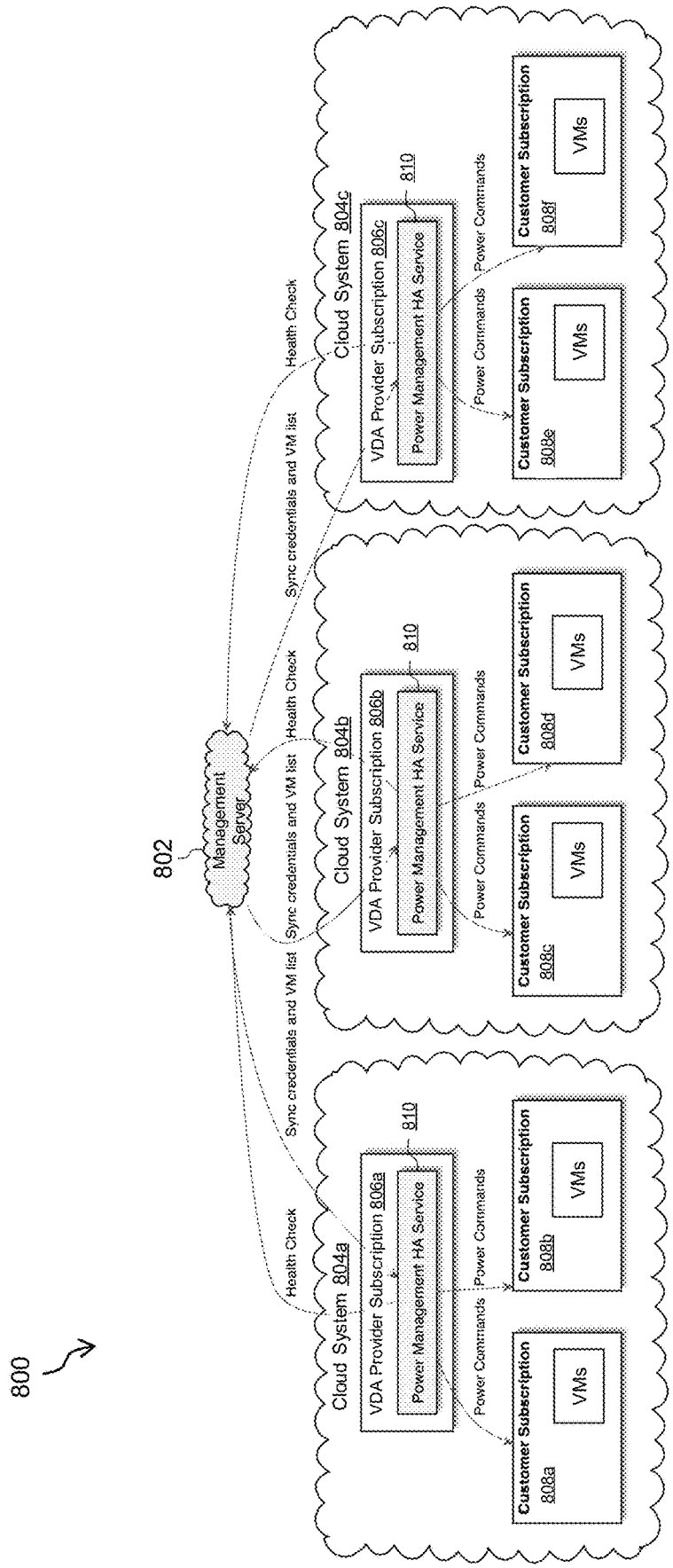
FIG. 8 is a diagram of a remote-access system architecture including a power management HA service deployed in multiple cloud systems, according to some embodiments of the present disclosure.

FIG. 8 is a diagram of a remote-access system architecture including a power management high-availability (HA) service deployed in multiple cloud systems. An illustrative architecture 800 includes a management server 802 and a plurality of cloud systems 804a, 804b, 804c, etc. (804 generally). The cloud systems 804 can include, for example, AMAZON WEB SERVICES (AWS), MICROSOFT AZURE, and/or GOOGLE CLOUD PLATFORM (GCP). In some embodiments, different cloud system's 804 can correspond to different regions within a single cloud provider, isolated from each other for redundancy or data sovereignty. A cloud system 804 can be multi-tenant, meaning that it host resources for multiple organizations, which may be referred to as "tenants" or "subscribers" of the cloud system. Within a cloud system 804, a subscriber's cloud computing resources (e.g., VMs, databases, etc.) may be isolated from those of other subscribers. The underlying computing hardware may be physically located in one or more geographically regions or zones in which the cloud system operates. A subscriber may choose which region or regions its cloud computing resources are located.

In the example of FIG. 8, a first cloud system 804a includes subscribers 806a, 808a, and 808b; a second cloud system 804b includes subscribers 806b, 808c, and 808d; and a third cloud system 804c includes subscribers 806c, 808e, and 808f. Subscribers 806a-c may correspond to subscriptions owned by a VDA provider such as CITRIX. Subscribers 808a-f may correspond to subscriptions owned by organizations that are customers of the VDA provider. Management server 802, which is operated by the VDA provider, may be hosted in one of the cloud systems 808 or in a separate cloud system or data center. In general, a given management server 802 can serve an arbitrary number of organizations located across one or more regions of one or more cloud systems. In some embodiments, there can be multiple management servers located in different geographic regions.

It is appreciated herein that it may be impractical (e.g., in terms of subscription costs and maintenance costs) to co-locate a management server in every cloud system and region where VDA customers are located. Thus, there may be significant geographic separation between a management server and an organization's VDA resources managed thereby. Such separate can increase the chance of a network failure that would prevent the management server from communicating with and managing the organization's VDA resources. To address this problem and provide added resiliency, in some embodiments, a lightweight power management HA service 810 can be deployed into many cloud regions across multiple cloud systems 804 where VDA customers are located. As illustrated in FIG. 8, in some embodiments HA service 810 may be deployed into VDA provider subscriptions 806, eliminating the need for VDA customers to host or manage the HA service 810. In other embodiments, HA service 810 can be deployed into one or more customer subscriptions 808. Instances of HA service 810 shown in FIG. 8 may be the same as or similar to HA service 502 of FIG. 5 or HA service 700 of FIG. 7.

In some embodiments, HA service 810 can be deployed into a subset of cloud regions where VDA customers are located to reduce system complexity and/or operational costs. The subset of cloud regions can be selected, for example, based on various factors such as the number of customer's that are hosted within each cloud vendor and cloud region. In regions where there is no HA service instance, VMs in those regions could be automatically powered on by an HA service instance running a different region (e.g., the geographically closest region where an HA service runs). In some embodiments, to provide greater redundancy, a given customer's VMs may be automatically powered on multiple HA service instances running in different cloud regions.

Figure 9:
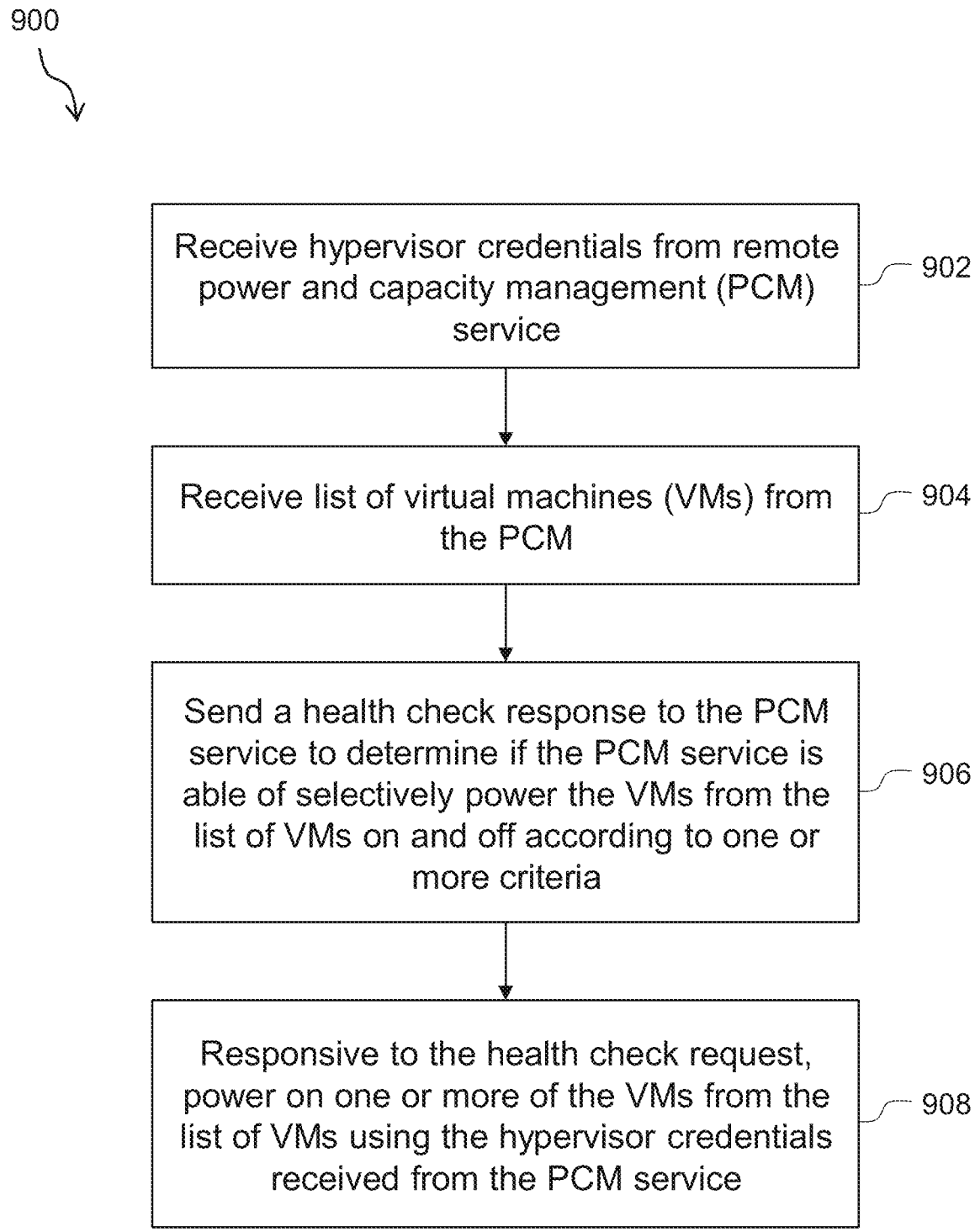
FIGS. 9 and 10 are flow diagrams showing processing that can be implemented within, or used in conjunction with, the systems and architecture of FIGS. 5 to 8, according to some embodiments of the present disclosure.
Figure 10:
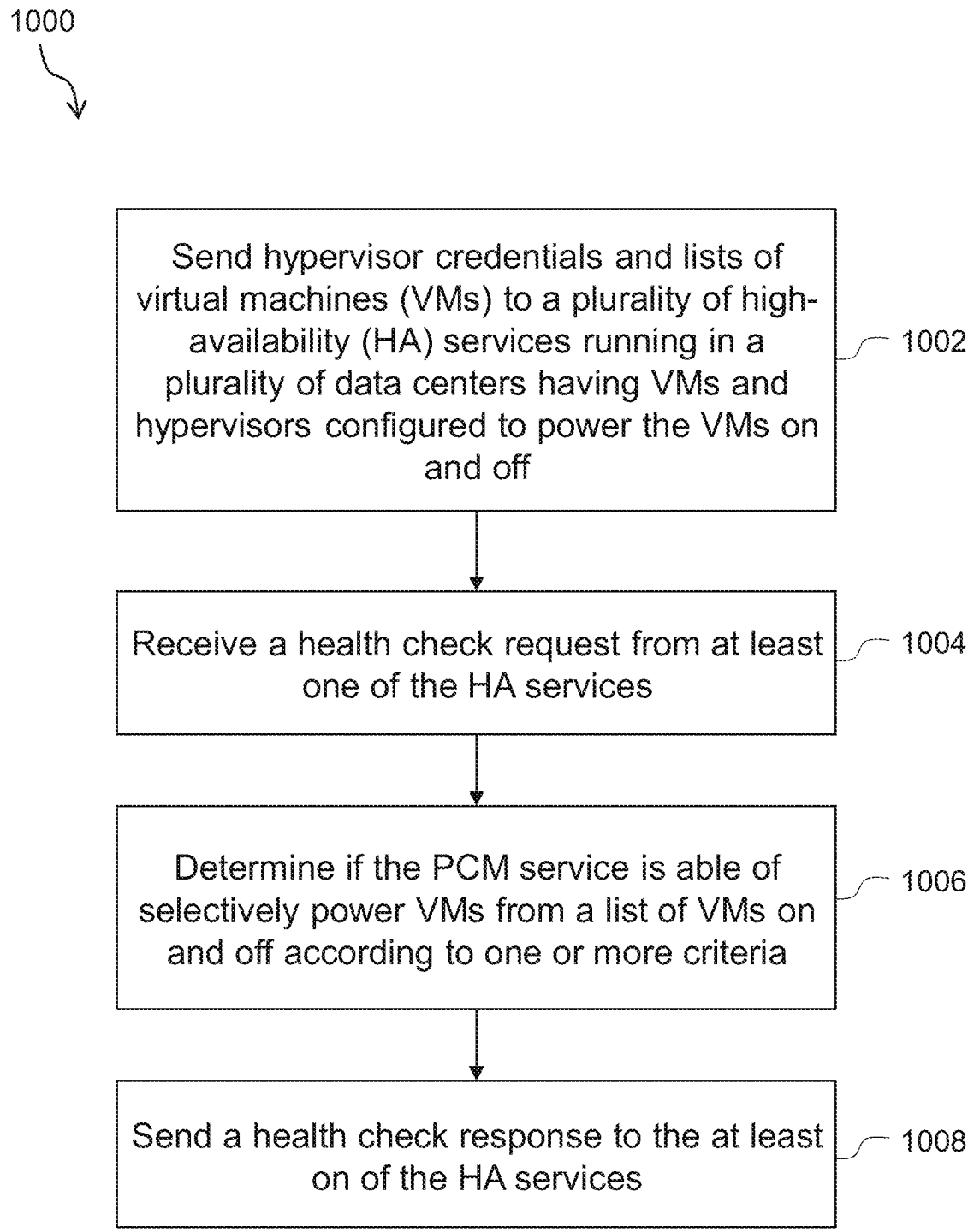

FIGS. 9 and 10 are flow diagrams showing processing that can be implemented within, or used in conjunction with, the systems of FIGS. 5 to 8.

Turning to FIG. 9, an illustrative process 900 can be implemented within a power management high-availability (HA) service running in a data center having a plurality of virtual machines (VMs) and a hypervisor configured to power the VMs on and off. For example, process 900 can be implemented within HA service 502 of FIG. 5, HA service 700 of FIG. 7, and/or HA service 810 of FIG. 8. The data center can correspond to an organization's on-prem system, a cloud system, or a particular zone or region of a cloud system where the organization's VMs are hosted. In some embodiments, the HA service may be deployed to the data center within a stateless container.

At blocks 902 and 904, the HA service can receive credentials for the hypervisor and a list of VMs from a power and capacity management (PCM) service configured to selectively power VMs from the list of VMs on and off according to one or more criteria. The PCM service may be running outside the data center (e.g., in a different cloud system or region).

At block 906, the HA service can send a health check request to the PCM service to determine if the PCM service is able of selectively power the VMs from the list of VMs on and off according to the one or more criteria. The criteria can include, for example, a schedule or a load threshold and may be configurable by an organization that utilizes the PCM service.

At block 908, in response to determining the PCM service is unable to selectively power the VMs from the list of VMs on and off according to the one or more criteria, the HA service can automatically power on one or more of the VMs from the list of VMs using the hypervisor credentials received from the PCM service. In some embodiments, the HA service can power on all VMs in the list of VMs received from the PCM service. In some embodiments, the HA service may receive a health check response from the PCM service indicating the PCM service is unable of selectively power the VMs from the list of VMs on and off according to the one or more criteria (e.g., due to a database failure or other failure at the PCM service). In other embodiments, the HA service may automatically power on the VMs after not receiving a response from the PCM service within a predetermined timeout period.

Turning to FIG. 10, an illustrative process 1000 can be implemented within a management server, such as management server 506 of FIG. 6, management server 600 of FIG. 6, and/or management server 802 of FIG. 8. In more detail, process 1000 can be implemented within a power and capacity management (PCM) service forming part of a management server, such as PCM service 612 of FIG. 6.

At block 1002, the PCM service can send hypervisor credentials and lists of virtual machines (VMs) to a plurality of high-availability (HA) services running in a plurality of data centers having VMs and hypervisors configured to power the VMs on and off. In some embodiments, the plurality of data centers includes data centers operated by at least two different cloud systems. In some embodiments, the plurality of data centers includes data centers located in at least two different regions of the same cloud system. In some embodiments, the PCM service may run in a first cloud system and at least one of the plurality of data centers is operated by a second cloud system different from the first cloud system. In some embodiments, the HA services may be deployed into the data centers within stateless containers.

At block 1004, the PCM service can receive a health check request from at least one of the HA services to determine if the PCM service is able of selectively power VMs from a list of VMs on and off according to one or more criteria.

At block 1006, the PCM service can determine if it is able to selectively power the VMs from the list of VMs for the HA service on and off according to the one or more criteria. For example, this step can include the PCM service determining if it is able to access a database where the criteria are stored or where VDA resource information is stored.

At block 1008, the PCM service can send a health check response to the HA service indicating whether it is able to selectively power the VMs on and off. If the PC service indicates that it cannot power VMs on and off, the HA service can automatically power on one or more of the VMs using the hypervisor credentials received from the PCM service. In some embodiments, the HA service can power on all VMs in the list of VMs received from the PCM service.

The following examples pertain to further embodiments, from which numerous permutations and configurations will be apparent.

Example 1 includes a method including: receiving, by a high-availability (HA) service running in a data center having a plurality of virtual machines (VMs) and a hypervisor configured to power the VMs on and off, credentials for the hypervisor and a list of VMs, the hypervisor credentials and the list of VMs received from a power and capacity management (PCM) service running outside the data center, the PCM service configured to selectively power VMs from the list of VMs on and off according to one or more criteria; sending, from the HA service to the PCM service, a health check request to determine if the PCM service is able of selectively power the VMs from the list of VMs on and off according to the one or more criteria; and in response to determining the PCM service is unable to selectively power the VMs from the list of VMs on and off according to the one or more criteria, powering on, by the HA service, one or more of the VMs from the list of VMs using the hypervisor credentials received from the PCM service.

Example 2 includes the subject matter of Example 1, wherein powering on the one or more of the VMs from the list of VMs includes powering on all VMs in the list of VMs received from the PCM service.

Example 3 includes the subject matter of Example 1 and further including receiving a health check response from the PCM service indicating the PCM service is unable of selectively power the VMs from the list of VMs on and off according to the one or more criteria.

Example 4 includes the subject matter of Examples 1 and 3, wherein the one or more criteria are stored in a database, wherein the receiving of the health check response from the PCM service includes receiving the health check response in response to the PCM service being unable to access the database.

Example 5 includes the subject matter of Example 1, wherein determining the PCM service is unable of selectively power the VMs from the list of VMs on and off according to the one or more criteria includes detecting the PCM service did not respond to the health check request.

Example 6 includes the subject matter of Example 1, wherein the PCM service configured to selectively power VMs from the list of VMs on and off according to a load threshold.

Example 7 includes the subject matter of Example 1, wherein the PCM service is configured to selectively power VMs from the list of VMs on and off according to a schedule.

Example 8 includes the subject matter of Example 1, wherein the HA service is deployed within a stateless container.

Example 9 includes the subject matter of Example 1, wherein the data center is operated by a first cloud system and the PCM service runs in a second cloud system different from the first cloud system.

Example 10 includes the subject matter of Example 1, wherein one or more of the plurality of VMs are configured as virtual desktops.

Example 11 includes a method including: sending, from a power and capacity management (PCM) service, hypervisor credentials and lists of virtual machines (VMs) to a plurality of high-availability (HA) services running in a plurality of data centers having VMs and hypervisors configured to power the VMs on and off; receiving, by the PCM service, a health check request from at least one of the HA services to determine if the PCM service is able of selectively power VMs from a list of VMs on and off according to one or more criteria; and sending, by the PCM service, a response to the at least one of the HA services indicating that the PCM service is unable to selectively power the VMs from the list of VMs on and off according to the one or more criteria, wherein the at least one of the HA services is configured to power on one or more of the VMs from the list of VMs using the hypervisor credentials received from the PCM service.

Example 12 includes the subject matter of Example 11, wherein powering on the one or more of the VMs from the list of VMs includes powering on all VMs in the list of VMs received from the PCM service.

Example 13 includes the subject matter of Example 11 and further including determining that the PCM service is unable to selectively power the VMs from the list of VMs on and off according to the one or more criteria by detecting a database failure.

Example 14 includes the subject matter of Example 11, wherein the plurality of data centers includes data centers operated by at least two different cloud systems.

Example 15 includes the subject matter of Example 11, wherein the plurality of data centers includes data centers located in at least two different regions of the same cloud system.

Example 16 includes the subject matter of Example 11, wherein the PCM service runs in a first cloud system and at least one of the plurality of data centers is operated by a second cloud system different from the first cloud system.

Example 17 includes the subject matter of Example 11, wherein the HA services are deployed within stateless containers.

Example 18 includes the subject matter of Example 11, wherein the plurality of data centers includes VMs configured as virtual desktops.

Example 19 includes an apparatus located in a data center having a plurality of virtual machines (VMs) and a hypervisor configured to power the VMs on and off, the apparatus including a processor and a non-volatile memory storing computer program code. The computer program code, when executed on the processor causes the processor to execute a process operable to: receive credentials for the hypervisor and a list of VMs from a power and capacity management (PCM) service running outside the data center, the PCM service configured to selectively power VMs from the list of VMs on and off according to one or more criteria; send a health check request to determine if the PCM service is able of selectively power the VMs from the list of VMs on and off according to the one or more criteria; and in response to determining the PCM service is unable to selectively power the VMs from the list of VMs on and off according to the one or more criteria, power on one or more of the VMs from the list of VMs using the hypervisor credentials received from the PCM service.

As used herein, the terms "processor," "service," and "module" are used to describe electronic circuitry that performs a function, an operation, or a sequence of operations. The function, operation, or sequence of operations can be hard coded into the electronic circuit or soft coded by way of instructions held in a memory device. The function, operation, or sequence of operations can be performed using digital values or using analog signals. In some embodiments, the processor, service, or module can be embodied in an application specific integrated circuit (ASIC), which can be an analog ASIC or a digital ASIC, in a microprocessor with associated program memory and/or in a discrete electronic circuit, which can be analog or digital. A processor, service, or module can contain internal processors, services, or modules that perform portions of the function, operation, or sequence of operations.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

All publications and references cited herein are expressly incorporated herein by reference in their entirety.

The invention claimed is:

1. A method comprising:
receiving, by a high-availability (HA) service running in a data center having one or more appliances, a plurality of virtual machines (VMs) and a hypervisor configured to power the VMs on and off, credentials for the hypervisor and a list of VMs, the hypervisor credentials and the list of VMs received from a power and capacity management (PCM) service running outside the data center, the PCM service configured to selectively power VMs from the list of VMs on and off according to one or more criteria, wherein the HA service is deployed within a stateless container running on an appliance of the one or more appliances, the appliance being separate from the hypervisor, and wherein the HA service is configured to automatically synchronize with the PCM service at startup;

sending, from the HA service to the PCM service, a health check request to determine if the PCM service is able of selectively power the VMs from the list of VMs on and off according to the one or more criteria; and
in response to determining the PCM service is unable to selectively power the VMs from the list of VMs on and off according to the one or more criteria, powering on, by the HA service, one or more of the VMs from the list of VMs using the hypervisor credentials received from the PCM service.

2. The method of claim 1, wherein powering on the one or more of the VMs from the list of VMs includes powering on all VMs in the list of VMs received from the PCM service.

3. The method of claim 1, further including receiving a health check response from the PCM service indicating the PCM service is unable of selectively power the VMs from the list of VMs on and off according to the one or more criteria.

4. The method of claim 3, wherein the one or more criteria are stored in a database, wherein the receiving of the health check response from the PCM service includes receiving the health check response in response to the PCM service being unable to access the database.

5. The method of claim 1, wherein determining the PCM service is unable of selectively power the VMs from the list of VMs on and off according to the one or more criteria includes detecting the PCM service did not respond to the health check request.

6. The method of claim 1, wherein the PCM service configured to selectively power VMs from the list of VMs on and off according to a load threshold.

7. The method of claim 1, wherein the PCM service is configured to selectively power VMs from the list of VMs on and off according to a schedule.

8. The method of claim 1, wherein the data center is a cloud system configured to host computing resources for a plurality of tenants, wherein the HA service is hosted within a first tenant of the plurality of tenants, and wherein the plurality of VMs and the hypervisor are hosted within a second tenant of the plurality of tenants different from the first tenant.

9. The method of claim 1, wherein the data center is operated by a first cloud system and the PCM service runs in a second cloud system different from the first cloud system.

10. The method of claim 1, wherein one or more of the plurality of VMs are configured as virtual desktops.

11. A method comprising:
sending, from a power and capacity management (PCM) service, hypervisor credentials and lists of virtual machines (VMs) to a plurality of high-availability (HA) services running in a plurality of data centers having one or more appliances, VMs and hypervisors configured to power the VMs on and off, wherein the HA service is deployed within a stateless container running on an appliance of the one or more appliances, the appliance being separate from the hypervisor, and wherein the HA service is configured to automatically synchronize with the PCM service at startup;
receiving, by the PCM service, a health check request from at least one of the HA services to determine if the PCM service is able of selectively power VMs from a list of VMs on and off according to one or more criteria; and
sending, by the PCM service, a response to the at least one of the HA services indicating that the PCM service is unable to selectively power the VMs from the list of VMs on and off according to the one or more criteria, wherein the at least one of the HA services is configured to power on one or more of the VMs from the list of VMs using the hypervisor credentials received from the PCM service.

12. The method of claim 11, wherein powering on the one or more of the VMs from the list of VMs includes powering on all VMs in the list of VMs received from the PCM service.

13. The method of claim 11, further including determining that the PCM service is unable to selectively power the VMs from the list of VMs on and off according to the one or more criteria by detecting a database failure.

14. The method of claim 11, wherein the plurality of data centers includes data centers operated by at least two different cloud systems.

15. The method of claim 11, wherein the plurality of data centers includes data centers located in at least two different regions of the same cloud system.

16. The method of claim 11, wherein the PCM service runs in a first cloud system and at least one of the plurality of data centers is operated by a second cloud system different from the first cloud system.

17. The method of claim 11, wherein the data center is a cloud system configured to host computing resources for a plurality of tenants, wherein the HA service is hosted within a first tenant of the plurality of tenants, and wherein the plurality of VMs and the hypervisor are hosted within a second tenant of the plurality of tenants different from the first tenant.

18. The method of claim 11, wherein the plurality of data centers includes VMs configured as virtual desktops.

19. An apparatus located in a data center having one or more appliances, a plurality of virtual machines (VMs) and a hypervisor configured to power the VMs on and off, the apparatus comprising:
- a processor; and
- a non-volatile memory storing computer program code that when executed on the processor causes the processor to execute a process operable to:
  - receive credentials for the hypervisor and a list of VMs from a power and capacity management (PCM) service running outside the data center, the PCM service configured to selectively power VMs from the list of VMs on and off according to one or more criteria, wherein the HA service is deployed within a stateless container running on an appliance of the one or more appliances, the appliance being separate from the hypervisor, and wherein the HA service is configured to automatically synchronize with the PCM service at startup;
  - send a health check request to determine if the PCM service is able of selectively power the VMs from the list of VMs on and off according to the one or more criteria; and
  - in response to determining the PCM service is unable to selectively power the VMs from the list of VMs on and off according to the one or more criteria, power on one or more of the VMs from the list of VMs using the hypervisor credentials received from the PCM service.

\* \* \* \* \*